United States Patent

[11] 3,609,191

| [72] | Inventor | Robert C. Wade |
| | | Ipswich, Mass. |
| [21] | Appl. No. | 834,584 |
| [22] | Filed | June 4, 1969 |
| [45] | Patented | Sept. 28, 1971 |
| [73] | Assignee | Ventron Corporation |
| | | Beverly, Mass. |

[54] POLYETHYLENE IMINE BORANES AND THEIR PREPARATION
3 Claims, No Drawings

[52] U.S. Cl. ................................................. 260/583 A, 8/116.2
[51] Int. Cl. .................................................. C07c 87/20
[50] Field of Search .................................................. 260/583 A

[56] References Cited
OTHER REFERENCES

Kelly et al., Journal of the American Chemical Society, Vol. 82 (1960) pages 4842 to 4846

*Primary Examiner*—Charles B. Parker
*Assistant Examiner*—Richard L. Raymond
*Attorney*—J. Harold Boss ABSTRACT: This invention relates to polyethylene imine boranes. They are prepared by reacting a polyethylene imine having a molecular weight from 600 to 100,000 with $THF:BH_3$ in tetrahydrofuran. The presently preferred boranes are prepared as above indicated using a polyethylene imine having a molecular weight between 600 and 1800. The solvent and reactants should be as anhydrous as possible. The properties vary with the amount of amino groups which are complexed to borane groups. Thus, the boranes made by reacting 1 $BH_3$ group for each 4 to 100 amino groups are viscous liquids which are fairly soluble in water and organic solvents including benzene. They are very substantive to anionic substrates and are useful for reductive bleaching and as stabilizing agents for cellulose, clay, etc. When a greater number of amino groups are converted to borane groups, such as 1 borane group for each 2 to 4 amino groups of the polyethylene imine, the products are extremely viscous polymers or solids. These products also retain slight water solubility (1 to 5%) and are useful where a more concentrated reducing activity is desired.

POLYETHYLENE IMINE BORANES AND THEIR PREPARATION

This invention relates to polyethylene imine boranes which contain both amino groups and borane groups.

It has long been known that the amine boranes represented by the formula $R_3N:BH_3$ are useful reducing agents which resist hydrolysis at pH>4. A wide variety of amines have been used in preparing amine boranes including polyamines, such as ethylene diamine bis borane ($H_3BH_2NCH_2NH_2BH_3$). This product, as reported by Kelly and Edwards in J. Am. Chem. Soc., 82, 4842(1960), can be prepared by the reaction of $THF:BH_3$ and ethylene diamine in tetrahydrofuran as a solvent. This material reduces organic carbonyl compounds and metal salts, such as $AgNO_3$ and $Cu(NO_3)_2$, to the pure metal. The same authors have also reported [Inorg. Chem. 2, 226(1963b0] that the product has high solubility (46–47 grams per liter) in THF and low solubility in water (8–9 grams per liter).

Polyethylene imines of high molecular weight, that is, having molecular weights from 600 to 100,000 are manufactured by the Dow Chemical Company under the trade name "PEI." I have discovered that if only a portion of the amino groups of a high molecular weight polyethylene imine are converted to borane groups, the resulting product possesses a unique combination of properties. In the practice of the invention, I presently prefer to employ polyethylene imines having a molecular weight of 600 to 1,800.

The preparative method used in the practice of the invention is the well-known method of adding $THF:BH_3$ to a tetrahydrofuran solution of the polymer. The solvent and reactants should be anhydrous. Since the "PEI" polymers contain 25 percent primary, 50 percent secondary, and 25 percent tertiary amino groups, the following locations are possible for each $BH_3$ (borane) group:

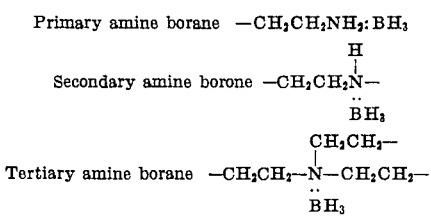

The borane group will prefer the strongest basic group available consistent with steric effects which might limit the accessibility of that group. Furthermore, the amount of $BH_3$ supplied for the reaction with the polymer ("PEI") will also determine the ratio of primary, secondary, and tertiary amine borane groups.

In the practice of the invention, I employ a range of a number of $BH_3$ groups from about one $BH_3$ group for each 100 amino groups to about one $BH_3$ group for each two available amino groups in the polymer. This range provides a unique combination of properties in the reaction product. The preferred range of number of $BH_3$ groups is about one $BH_3$ group for each four to 10 available amino groups in the polyethylene imine.

When small amounts of $BH_3$ groups are reacted with the polyethylene imine, for example, one $BH_3$ group for each four to 100 available amino groups the products are viscous liquids which are soluble in water and organic solvents including benzene and are very substantive to anionic substrates. These products carry the $BH_3$ reducing group to the substrate and are useful, for example, as reductive-bleaching and stabilizing agents for cellulose and clay.

When more $BH_3$ groups are reacted with the polymer, for example, one $BH_3$ group for each two to four available amino groups, the products are extremely viscous polymers or solids. These products also retain slight water solubility (1 to 5 percent) and are useful where a more concentrated reducing activity is desired in the molecule and the reducing agent retains its stability toward hydrolysis at a pH as low as 5. These products are useful as reducing agents in chemical plating baths for nickel, copper, silver, etc. where plating is desired to take place in the pH range of five to eight.

The invention is illustrated further by the following specific examples.

The results of several runs are shown in the following table. The apparatus used was the same in each run and comprise a 500 ml. three-necked flask which was fitted with a dropping funnel, a thermometer, and a reflux condenser. A gas line connected the top of the reflux condenser with a wet test meter. The reaction flask was heated, when necessary, with a Glas-Col mantle and stirred with a mag-mix bar. The polyethylenimine (PEI) and THF were weighed into the flask before the apparatus was assembled. The products were dried by a flash evaporator except Run 6. The products all were dark tan to brown color after drying. 100 ml. of tetrahydrofuran (THF) was used in all runs as solvent.

I claim:

1. A polyethylene imine having a molecular weight between 600 and 100,000 and having about one for each two to 100 of its available amino groups complexed to a $BH_3$ group.

TABLE I

| Runs | Run 1 | Run 2 | Run 3 | Run 4 | Run 5 | Run 6 |
|---|---|---|---|---|---|---|
| Actual concentration [1] | PEI-6, .5 mole; $THFBH_3$, .25 mole. | PEI-6, .5 mole; $THFBH_3$, .125 mole. | PEI-18, .5 mole; $THFBH_3$, .25 mole. | PEI-18, .5 mole; $THFBH_3$, .125 mole. | PEI-6, 1 mole; $THFBH_3$, .1 mole. | PEI-18, 1 mole; $THFBH_3$, .1 mole. |
| Ratio of PEI to $BH_3$ | 10:5 | 10:2.5 | 10:5 | 10:2.5 | 10:1 | 10:1. |
| Drying process | Flash evap | Flash evap | Flash evap | Flash evap | Flash evap | House vac. in oil bath. |
| Appearance dried product | Solid | Semi-solid | Solid | Semi-solid | Very heavy liquid. | Very heavy liquid. |
| Melting point of solid in reaction flask. | Above 60° C | Above 60° C | Above 60° C | Above 60° C | 42° C. | 45° C. |
| Hydride analysis, percent | 2.8 | 1.4 | 2.3 | 1.2 | 0.8 | Not analyzed. |
| Theoretical, percent | 3.0 | 1.5 | 3.0 | 1.5 | 0.7 | Not analyzed. |

[1] The molecular weight of PEI is taken as the molecular weight of one unit $(—CH_2CH_2NH—)=43$.

2. A polyethylene imine having a molecular weight between 600 and 1,800 and having about one for each two to 100 of its available amino groups complexed to a $BH_3$ group.

3. A polyethylene imine having a molecular weight between 600 and 1,800 and having about one for each four to 100 of its available amino groups complexed to $BH_3$ groups.